(12) United States Patent
Swank et al.

(10) Patent No.: US 8,070,653 B2
(45) Date of Patent: Dec. 6, 2011

(54) METHOD AND SYSTEM FOR CONTROLLING ENGINE SPEED, ENGINE TORQUE AND OUTPUT FROM A TORQUE CONVERTER

(75) Inventors: Michael G. Swank, Shreve, OH (US); Patrick Lindemann, Wooster, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 554 days.

(21) Appl. No.: 11/637,639

(22) Filed: Dec. 12, 2006

(65) Prior Publication Data
US 2007/0142174 A1 Jun. 21, 2007

Related U.S. Application Data

(60) Provisional application No. 60/751,507, filed on Dec. 19, 2005.

(51) Int. Cl.
*B60W 10/02* (2006.01)
(52) U.S. Cl. ........................................ 477/180
(58) Field of Classification Search ................. None
See application file for complete search history.

(56) References Cited

U.S. PATENT DOCUMENTS

| | | | |
|---|---|---|---|
| 3,822,771 A * | 7/1974 | Audiffred et al. | 477/168 |
| 6,494,303 B1 | 12/2002 | Reik et al. | |
| 2004/0166992 A1 * | 8/2004 | Buchanan et al. | 477/181 |
| 2007/0004554 A1 * | 1/2007 | Hans et al. | 477/107 |

* cited by examiner

*Primary Examiner* — David D Le
*Assistant Examiner* — Erin D Bishop
(74) *Attorney, Agent, or Firm* — Simpson & Simpson, PLLC (57) ABSTRACT

The present invention broadly comprises a method for controlling engine speed, engine torque, and torque converter output including the steps of applying engine torque to a torque converter and modulating the transferring of the torque to a pump for the torque converter. In some aspects, the torque converter further comprises a pump clutch and the method applies torque to the pump clutch and controllably slips the pump clutch. In some aspects, the method supplies engine torque from an engine with a turbocharger and controllably slips the pump clutch to increase speed and torque for the engine during a launch event for the vehicle or determines a parameter regarding operation of the vehicle and controllably slips the pump clutch responsive to the parameter. The present invention also comprises a method for controlling torque converter output by connecting a clutch between an engine and a torque converter and controllably slipping the clutch.

5 Claims, 8 Drawing Sheets

METHOD AND SYSTEM FOR CONTROLLING ENGINE SPEED, ENGINE TORQUE AND OUTPUT FROM A TORQUE CONVERTER

CROSS-REFERENCE TO RELATED APPLICATIONS

This application claims the benefit under 35 U.S.C. §119 (e) of U.S. Provisional Application No. 60/751,507, filed Dec. 19, 2005.

FIELD OF THE INVENTION

The invention relates to improvements in apparatus for transmitting force between a rotary driving unit (such as the engine of a motor vehicle) and a rotary driven unit (such as the variable-speed transmission in the motor vehicle). In particular, the invention relates to a method for controllably slipping a pump clutch in a torque converter or for controllably slipping a clutch inserted between an engine and a torque converter. Specifically, the method reduces turbo-lag for vehicles with turbocharged engines or controls torque output in response to parameters associated with operation of the vehicle.

BACKGROUND OF THE INVENTION

Turbochargers are used in vehicle engines to increase the power output of the engine without increasing the size of the engine, specifically, the cylinder displacement. That is, a turbocharger can significantly improve the power-to-weight ratio for the engine. A turbocharger uses the exhaust flow from the engine to spin a turbine, which in turn spins an air pump. The turbine in the turbocharger spins at speeds of up to 150,000 rotations per minute. Power increases of 30 to 40 percent are typical for turbocharged engines.

Unfortunately, turbochargers do not provide an immediate power boost during a launch event. A time period, typically measured in seconds or fractions of seconds is needed for the turbine to reach the speeds necessary to produce the desired boost. This phenomenon, known as "turbo-lag," results in a hesitation at the start of a launch event. It is known to decrease turbo-lag by reducing the inertia of the rotating parts in the turbocharger, mainly by reducing the weight of the parts. This weight reduction enables the turbine and compressor to accelerate more quickly, and start providing boost earlier. Inertia can be reduced by reducing the size of the turbocharger. Unfortunately, a smaller turbocharger may not be able to provide adequate boost at higher engine speeds. Also, a smaller turbocharger may rotate at excessive speeds.

For turbocharger engines in vehicles with torque converters, it is known to use a "loose" torque converter. This arrangement allows the engine to attain higher speeds during the launch event, decreasing the time necessary for the turbocharger to reach the desired speed. Unfortunately, this configuration results in a decrease in fuel economy across the entire operating range of the torque converter.

Thus, there is a long-felt need for a means to reduce turbo-lag without compromising fuel economy or the performance of the turbocharger.

BRIEF SUMMARY OF THE INVENTION

The present invention broadly comprises a method for controlling engine speed, engine torque, and torque converter output in a vehicle including the steps of applying engine torque to a torque converter and modulating the transfer of the torque to a pump for the torque converter. In some aspects, the torque converter further comprises a pump clutch, applying engine torque further comprises applying torque to the pump clutch, and modulating further comprises controllably slipping the pump clutch. In some aspects, the method supplies engine torque from an engine with a turbocharger and controllably slips the pump clutch to increase speed and torque for the engine during a launch event for the vehicle. In some aspects, the method opens the pump clutch prior to applying the engine torque, fully closes the pump clutch after controllably slipping the pump clutch, or reduces slippage in the clutch at a predetermined rate. In some aspects, the method determines a parameter regarding operation of the vehicle, in particular, traction for the vehicle, and controllably slips the pump clutch responsive to the parameter. In some aspects, the method controllably slips the pump clutch to limit the torque output.

The present invention also broadly comprises a method for controlling engine speed, engine torque, and torque converter output in a vehicle including connectively disposing a clutch between an engine in the vehicle and the torque converter, applying torque from the engine to the clutch, and controllably slipping the clutch. In some aspects, the engine is equipped with a turbocharger and the method controllably slips the clutch during a launch event for the vehicle or reduces slippage in the clutch at a predetermined rate. In some aspects, the method determines a parameter regarding operation of the vehicle and controllably slips the clutch responsive to the parameter. In some aspects, the parameter is regarding traction for the vehicle. In some aspects, the method limits the torque output.

The present invention also broadly comprises a method for increasing engine speed and torque in a vehicle equipped with a turbocharged engine, including the steps of: applying, during a launch event, engine torque to a torque converter; transferring the torque to a pump clutch in the torque converter; controllably slipping the pump clutch; reducing slippage in the clutch at a predetermined rate; and, fully closing the pump clutch.

The present invention still further broadly comprises a system for controlling engine speed, engine torque, and torque converter output in a vehicle including a clutch connected between an engine and a torque converter for the vehicle and a control element configured to controllably slip the clutch. In some aspects, the engine is turbocharged and the control element is configured to controllably slip the clutch during a launch event for the vehicle. In some aspects, the control element is configured to reduce slippage in the clutch at a predetermined rate or the control element is configured to close the clutch after the clutch is controllably slipped. In some aspects, the system includes a sensing element to determine a parameter associated with operation of the vehicle, in particular, traction for the vehicle, and to provide a signal regarding the parameters. The control element is configured to receive the signal and to controllably slip the clutch responsive to the signal. In some aspects the control element is configured to limit the torque output.

It is a general object of the present invention to provide a method for reducing turbo-lag associated with a launch event for a vehicle equipped with a turbocharged engine.

It is another object of the present invention to provide a method for increasing engine speed and torque during a launch event for a vehicle with a turbocharged engine.

It is yet another object of the present invention to provide a method for controlling engine speed, engine torque, or torque output from a torque converter in response to vehicle operation parameters.

It is yet a further object of the present invention to provide a system for controlling torque output from a torque converter in response to vehicle operation parameters or to reduce turbo-lag during a launch event.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
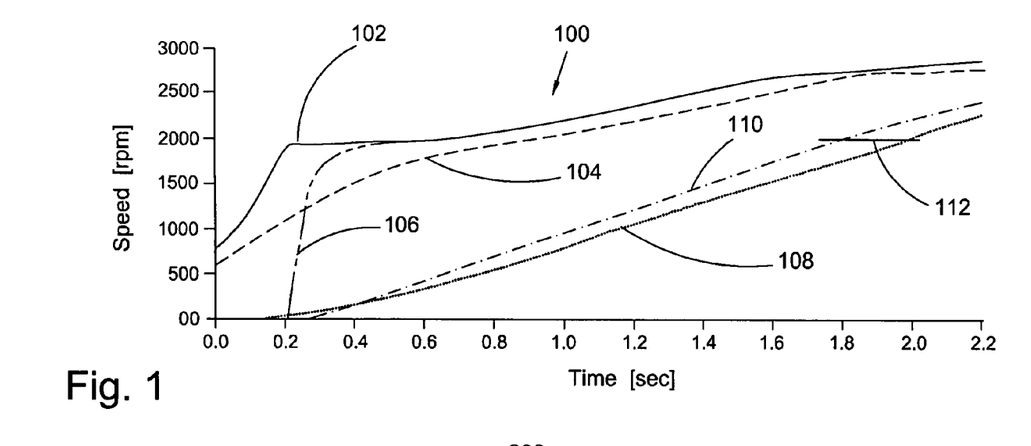
FIG. 1 is a graph showing respective speeds for components of a vehicle having a turbocharger with and without use of a present invention method of increasing engine speed and engine torque during a launch event.

FIG. 1 is a graph showing respective speeds for components of a vehicle having a turbocharger and using a present invention method of increasing engine speed and engine torque during a launch event.

Figure 2:
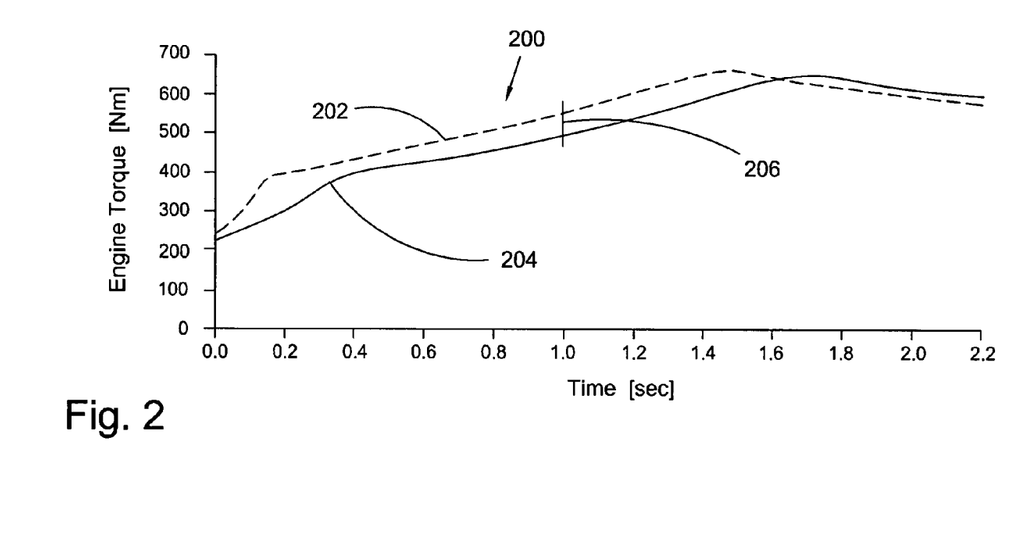
FIG. 2 is a graph showing respective engine torque for the vehicle of FIG. 1 with and without use of a present invention method of increasing engine speed and engine torque during a launch event.

FIG. 2 is a graph showing respective engine torque for the vehicle of FIG. 1 with and without use of a present invention method of increasing engine speed and engine torque during a launch event.

FIGS. 1 and 2 are with respect to a launch event for a diesel engine equipped with a turbocharger. However, it should be understood that the present invention is not limited to diesel engines and that the use of the present invention with other types of turbocharged engines is included in the spirit and scope of the invention as claimed. By launch event we mean putting in motion a vehicle fully or substantially at rest or putting in forward motion a vehicle on an upwardly slanted slope (from back to front of the vehicle) and experiencing a force in the reverse direction.

Figure 3:
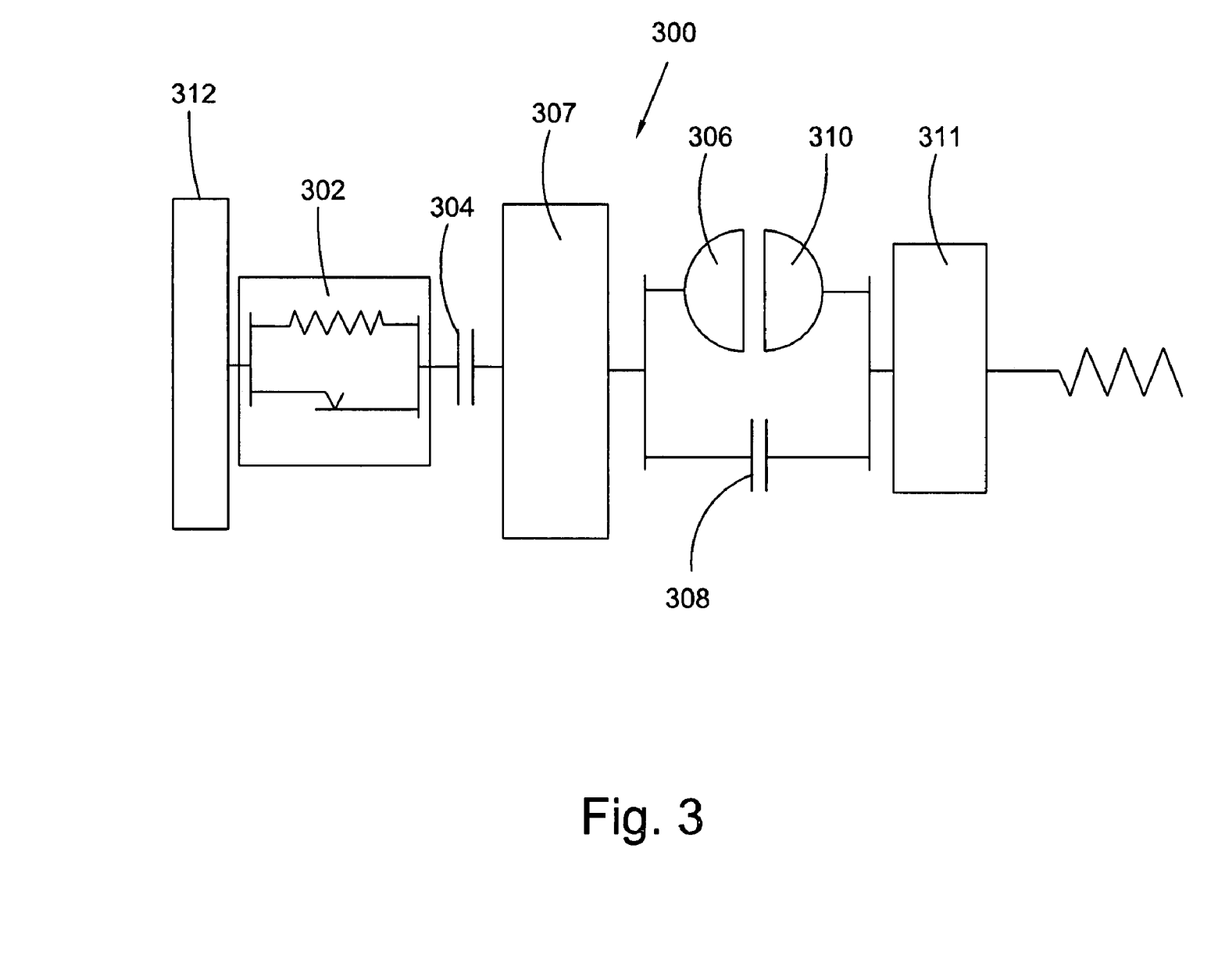
FIG. 3 is a functional schematic of a multi-function torque converter.

FIG. 3 is a functional schematic of multi-function torque converter 300. The following should be viewed in light of FIGS. 1 through 3. In some aspects, and as shown in FIGS. 1 and 2, a multi-function torque converter (MFTC) is used with the present invention method. FIG. 3 illustrates the basic function and structure of an MFTC. An MFTC is described in U.S. Pat. No. 6,494,303, "TORSIONAL VIBRATION DAMPER FOR A TORQUE TRANSMITTING APPARATUS," issued Dec. 17, 2002 and incorporated herein by reference. However, it should be understood that the present invention method can be applied to any MFTC known in the art or to any torque converter employing a clutch between the torsional input to the converter and a pump for the converter and that such application is included in the spirit and scope of the invention as claimed.

MFTC 300 includes damper 302, pump clutch 304, pump 306, pump cover 307, torque converter clutch 308, and turbine 310 and turbine cover 311. During a typical launch event, engine 312 supplies torque to damper 302 and clutch 304 is closed relatively quickly and slippage of the clutch is substantially limited. A present method applies engine torque from a turbocharged engine to a torque converter, for example, from engine 312 to damper 302, to initiate a launch event for the vehicle containing the engine and converter. In some aspects, the present method modulatingly transfers the torque to the torque converter pump, for example, pump 306. By modulatingly transfer we mean that the intensity or magnitude of the torque is varied or modulated in a controlled manner as the torque is transferred to the pump. In some aspects, this modulation is accomplished by controllably slipping the pump clutch. That is, the clutch is controlled such that the clutch is allowed to slip in a predetermined manner, rather than closing as quickly as possible. By modulating the torque transfer, the speed and torque of the engine are increased during a launch event, enabling the turbocharger to more quickly attain the desired operating speed. In so doing, the turbo-lag normally associated with the launch event is greatly reduced.

Any method known in the art can be used to modulate the torque transfer, or more specifically, to controllably slip the pump clutch. For example, existing control devices, programs, or strategies associated with an MFTC can be modified to operate the pump clutch to produce the controlled slippage of the present invention.

The increase in engine speed (as well as in other torque converter components) is illustrated in FIG. 1. In graph 100, line 102 shows engine speed using the present method in a MFTC and line 104 shows engine speed using a torque converter without a pump clutch, hereinafter referred to as a standard torque converter (STC). In the first two tenths of a second, there is a significant increase in engine speed using the present method. For example, at 0.2 seconds, line 102 is at approximately 2,000 rotations per minute (rpm), while line 104 is at approximately 1,200 rpm. Line 102 remains higher than line 104 until the two lines nearly merge at approximately 1.9 seconds. This increase in engine speed, especially at the beginning of the launch event, results in an increase in turbocharger speed and subsequent reduction in turbo-lag.

Line 106 shows the rotational speed of the pump in the MFTC. The method opens the pump clutch at the beginning of the launch event, before engine torque is applied to the torque converter and hence to the pump clutch, and then begins to engage the pump clutch (allowing the pump clutch to slip). The method reduces slippage in the clutch at a predetermined rate as the launch event continues. Alternately stated, the clutch is closed at a predetermined rate. In general, the predetermined rate differs from the rate at which a pump clutch would be closed in other operations involving the pump clutch. Typically, the rate at which the clutch closes is reduced according to the present invention. That is, the clutch is slipped more than is typically associated with other operations involving the pump clutch. Then, at a predetermined point, the method fully closes the pump clutch and the pump is fully engaged with the engine torsional input.

In FIG. 1, the pump clutch remains open until approximately 0.2 seconds. As the pump clutch closes after 0.2 seconds, line 106 rises until the engine and pump speed are the same (pump clutch fully engaged) at approximately 0.5 seconds. Thus, for the initial 0.2 seconds, the engine associated with the MFTC is free of the resistance of the hydrodynamic circuit and therefore, is able to rotate faster. For the vehicle with the STC, there is no pump clutch, so the rotational speed of the pump matches the speed of the engine, as shown by line 104.

Turbo-lag can be gauged by the output speed of the turbine, which determines the speed of the vehicle. Initially line 108 (the turbine for the STC) is slightly higher than line 110 (the turbine for the MFTC). However, at approximately 0.4 seconds line 108 and remains higher than line 108 for the remainder of graph 100. When the respective turbine reaches approximately 2,000 rpm, point 112, the vehicle is traveling at about 30 kilometers per hour (kph). As graph 100 shows, with the present method, a vehicle reaches 30 kph approximately 0.2 seconds faster using the present invention method. That is, line 110 reaches 2,000 rpm 0.2 seconds faster than line 112. This increase in acceleration is a result of reduced turbo-lag.

Advantages of a present invention also are shown in FIG. 2. In graph 200, line 202 shows engine torque using a present method in a MFTC and line 204 shows engine torque using a STC without a present method. For the first 0.2 seconds, line 202 rises noticeably faster than line 204, denoting a desirable increase in engine torque using the present method. Line 204 begins to approach line 202 at about 0.4 seconds and the two lines reach the same point at about 1.5 seconds. At point 206, 1.0 second, the engine associated with the MFTC is producing about 15% more torque than the engine associated with the STC. Increasing engine torque helps a turbocharger to more quickly reach optimal operating speed. Therefore, the increase in torque illustrated in graph 200 results in a reduction in turbo-lag for the engine using the present method.

It should be understood that a present invention method is not limited to reducing turbo-lag. In some aspects, as further described infra, the present invention is used to control output from a torque converter in response to parameters associated with operation of the vehicle. For example, the present invention is used in torque limiting operations. In some aspects, the torque limiting application is regarding traction control. For example, the present invention is used to reduce torque converter output to subsequently reduce torque supplied to one or more vehicle wheels in response to a loss of traction by the wheels. The traction control can be associated with a launch event.

Figure 4:
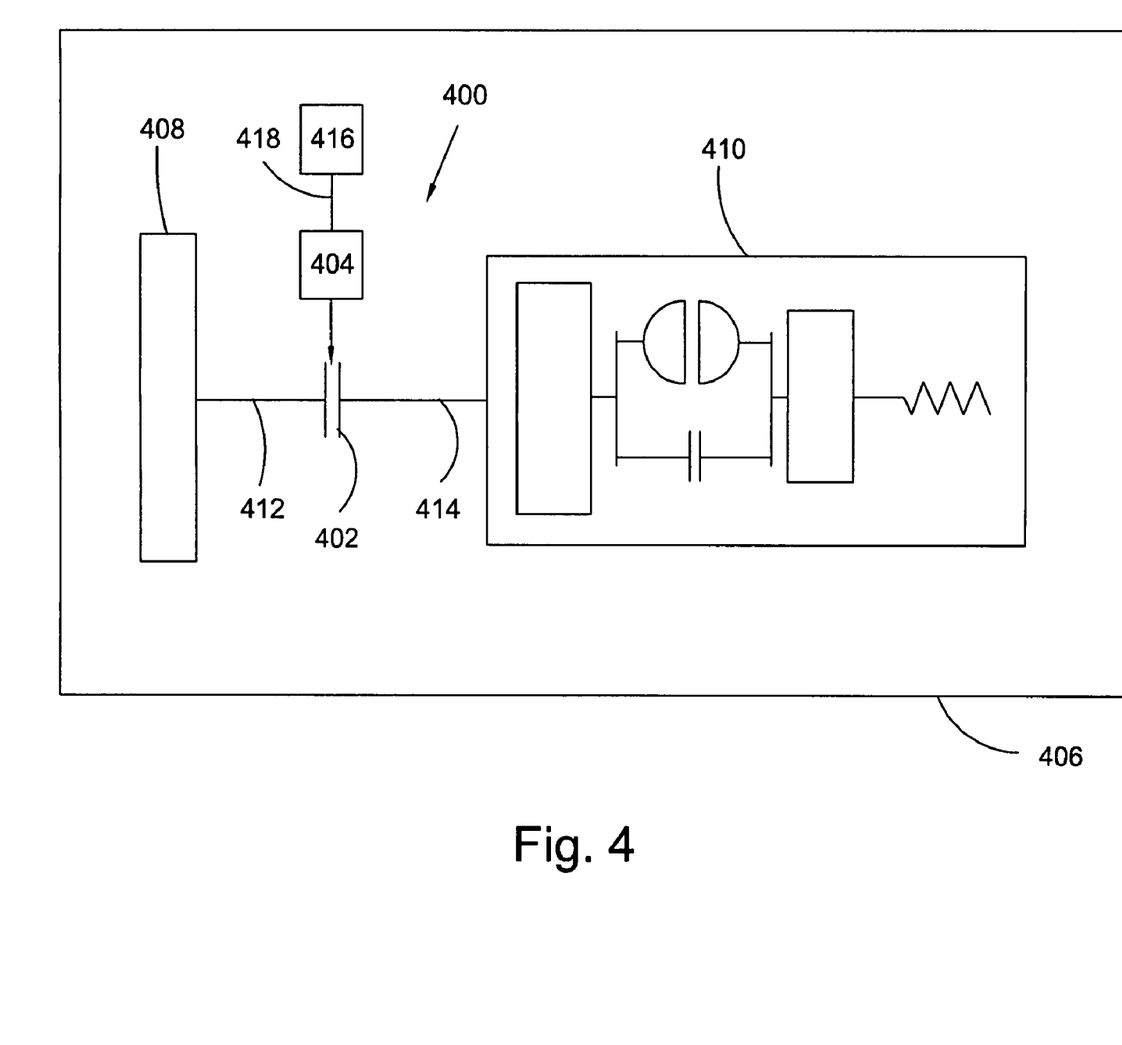
FIG. 4 is a functional schematic of a present invention system for controlling engine speed, engine torque, and torque converter output.

FIG. 4 is a functional schematic of present invention system 400 for controlling engine speed, engine torque and torque converter output. Present invention system 400 includes clutch 402 and control element 404. Vehicle 406 includes engine 408 and STC 410. In some aspects, the engine is turbocharged. However, it should be understood that system 400 is not limited to use with turbocharged engines. An input for the clutch is connected to an output for the engine via crankshaft 412. An output for the clutch is connected to an input for the STC via coupling means 414. Any coupling means known in the art can be used for 414. It should be understood that the present invention is not limited to use with any particular type of vehicle, engine, or STC and the use of the present invention with any vehicle, engine, or STC known in the art is included in the spirit and scope of the invention as claimed. The following example is for a turbocharged engine 408. Control element 404 is configured to controllably slip clutch 402 during the launch event for vehicle 406. That is, the clutch is controlled such that the clutch is allowed to slip in a predetermined manner, as discussed supra in the descriptions for FIGS. 1 through 3. It should be understood that any control device, control program, or control strategy known in the art to control the operation of clutches in a vehicle can be used for and with control element 404. As discussed supra in the descriptions for FIGS. 1 through 3, by modulating the torque transfer, the speed and torque of the engine are increased during the launch event, enabling the turbocharger to more quickly attain the desired operating speed. In so doing, the turbo-lag normally associated with the launch event is greatly reduced.

As discussed supra in the descriptions for FIGS. 1 through 3, control element 404 closes the clutch as the launch event continues. Alternately stated, the slippage is reduced. Then, at a predetermined point, the control element fully closes the pump clutch and the engine torque passes through the clutch to the STC. Thus, until the engine is fully engaged with the STC, the engine speed and torque are increased, in comparison with the case (not shown) in which an engine is directly connected to an STC. As discussed supra in the descriptions of FIGS. 1 through 3, this increase in engine speed and torque reduces turbo-lag.

In some aspects, control of clutch 402 is with respect to a parameter associated with the operation of vehicle 406. Sensing element 416 is used to sense, monitor, determine, measure, or evaluate the parameter. The parameter can be with respect to any applicable operation of the vehicle and element 416 can be any device known in the art for use regarding the parameter in question. Element 416 supplies a signal regarding the parameter to element 404 on line 418. Line 418 can be any type of signal line known in the art or can be any other type of communication link, such as a radio frequency link. In some aspects, the operation is with respect to traction for the vehicle and element 416 measures the traction of the wheels (not shown) for the vehicle. Based on the signal on line 418, element 404 controllably slips the clutch. This slippage reduces torque to the wheels and hence addresses the traction problem detected by element 416. Elements 404 and 416 and clutch 402 work on any feed-back or other control arrangement known in the art.

Figure 5:
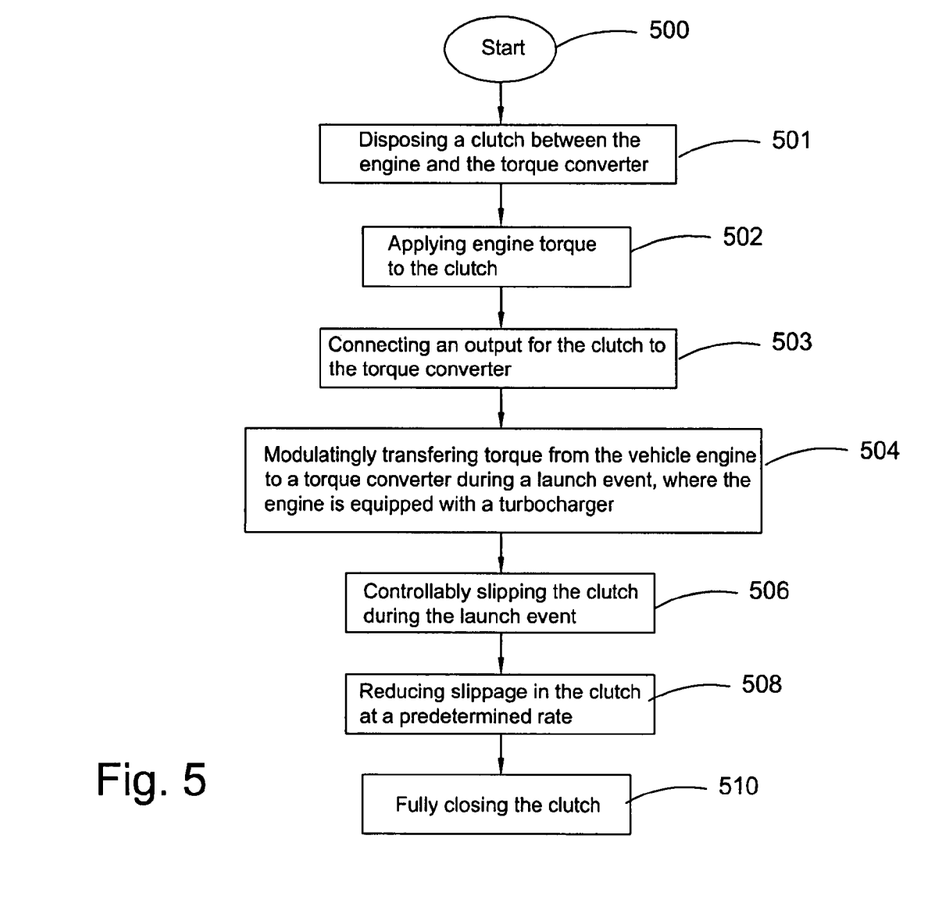
FIG. 5 is a flowchart illustrating a method for reducing turbo-lag in accordance with the present invention.

FIG. 5 is a flowchart illustrating a method for reducing turbo-lag in accordance with the present invention. Although the method of FIG. 5 (and FIGS. 6 through 9 below) is depicted as a sequence of numbered steps for clarity, no order should be inferred from the numbering unless explicitly stated. The method starts at Step 500. Step 504 modulatingly transfers torque from a vehicle engine to a torque converter during a launch event, where the engine is equipped with a turbocharger. Step 501 disposes a clutch between the engine and the torque converter. Step 502 applies engine torque to the clutch. Step 503 connects an output for the clutch to the torque converter. Step 506 controllably slips the clutch during the launch event. Step 508 reduces slippage in the clutch at a predetermined rate. Step 510 fully closes the clutch.

Figure 6:
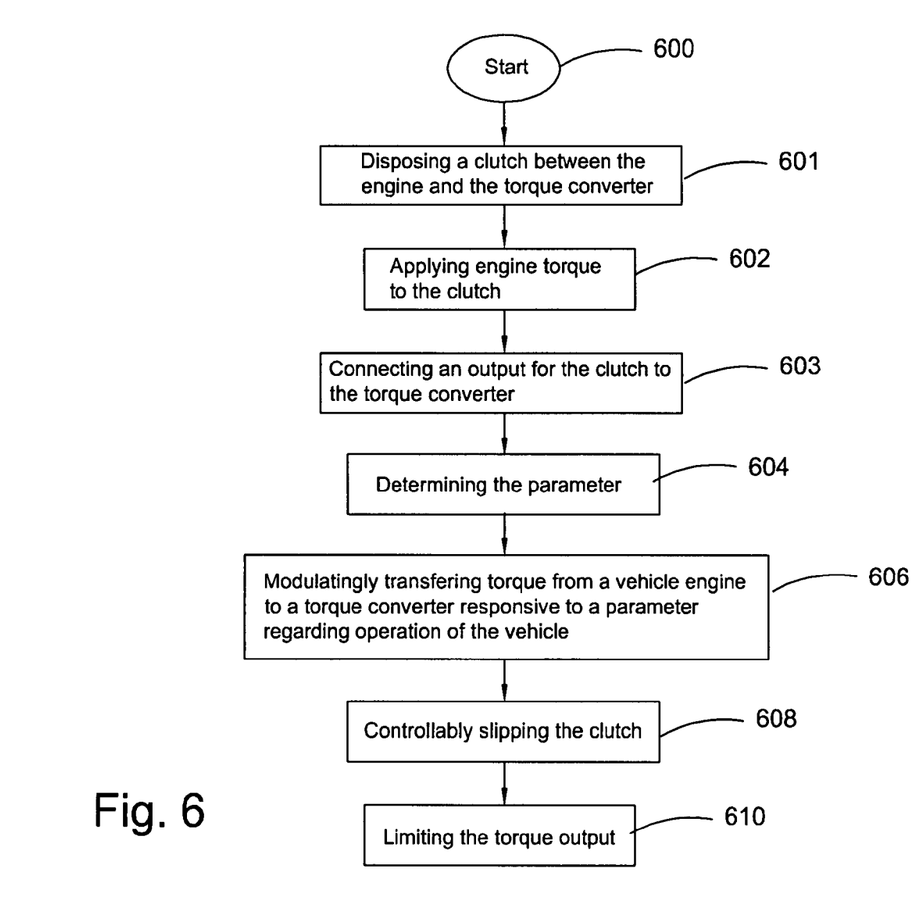
FIG. 6 is a flowchart illustrating a method for controlling torque converter output in a vehicle in response to a vehicle operating parameter in accordance with the present invention.

FIG. 6 is a flowchart illustrating a method for controlling torque converter output in a vehicle in response to a vehicle operating parameter in accordance with the present invention. The method starts at Step 600. Step 606 modulatingly transfers torque from a vehicle engine to a torque converter responsive to a parameter regarding operation of the vehicle. Step 601 disposes a clutch between the engine and the torque converter. Step 602 applies engine torque to the clutch. Step 603 connects an output for the clutch to the torque converter. Step 604 determines the parameter. In some aspects, the parameter is with respect to traction for the vehicle. In some aspects, Step 608 controllably slips the clutch. Step 610 limits the torque output.

Figure 7:
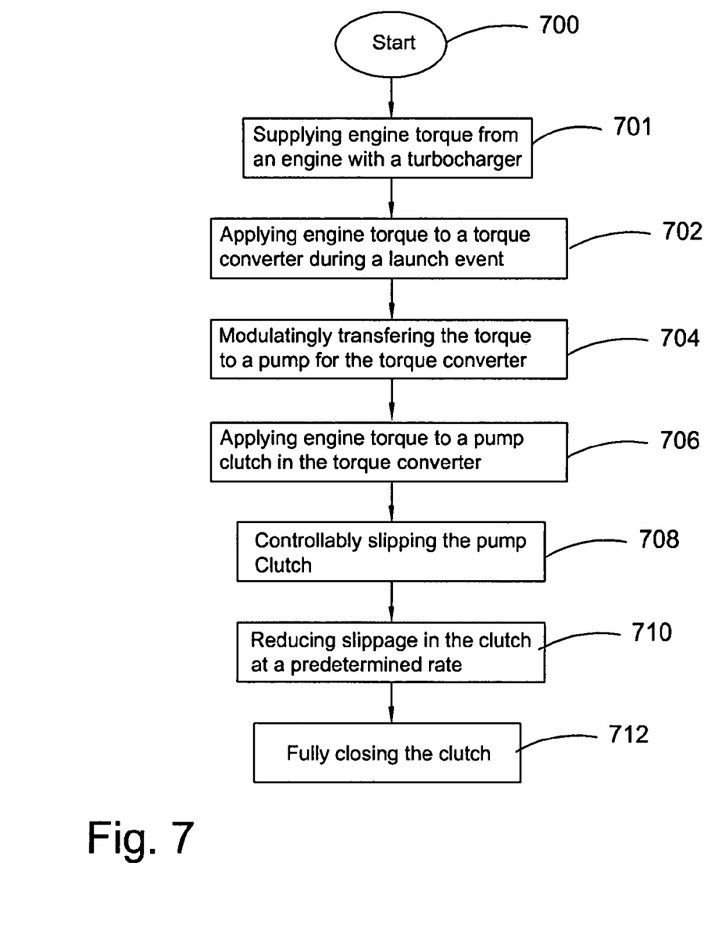
FIG. 7 is a flowchart illustrating another method for reducing turbo-lag in accordance with the present invention.

FIG. 7 is a flowchart illustrating another method for reducing turbo-lag in accordance with the present invention. The method starts at Step 700. Step 702 applies engine torque to a torque converter during a launch event. Step 704 modulatingly transfers the torque to a pump for the torque converter. In some aspects, Step 701 supplies engine torque from an engine with a turbocharger. In some aspects, Step 706 applies engine torque to a pump clutch in the torque converter. Then, Step 708 controllably slips the pump clutch. Step 710 reduces slippage in the clutch at a predetermined rate. Step 712 fully closes the clutch.

Figure 8:
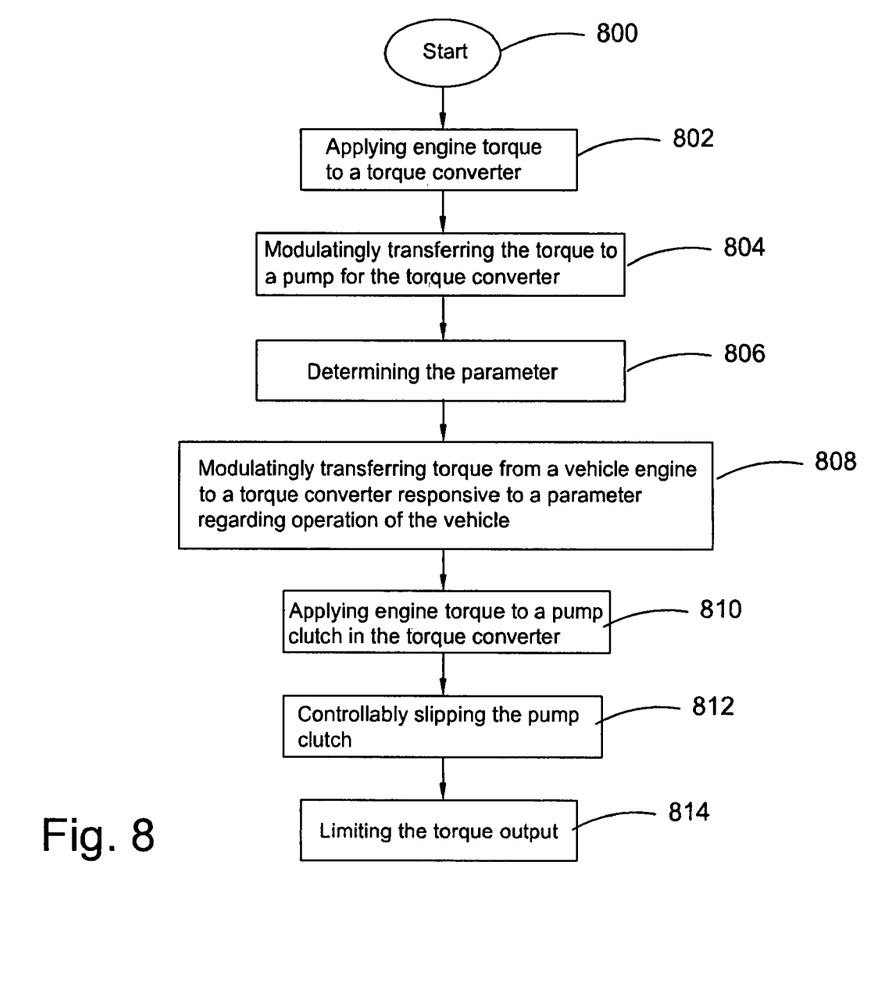
FIG. 8 is a flowchart illustrating another method for controlling torque converter output in a vehicle in response to a vehicle operating parameter in accordance with the present invention; and, FIG. 9 is a flowchart illustrating a method for increasing turbine speed in a vehicle equipped with a turbocharged engine in accordance with the present invention.

FIG. 8 is a flowchart illustrating another method for controlling torque converter output in a vehicle in response to a vehicle operating parameter in accordance with the present invention. The method starts at Step 800. Step 808 modulatingly transfers torque from a vehicle engine to a torque converter responsive to a parameter regarding operation of the vehicle. Step 802 applies engine torque to a torque converter. Step 804 modulatingly transfers the torque to a pump for the torque converter. Step 806 determines the parameter. In some aspects, the parameter is with respect to traction for the vehicle. In some aspects, Step 810 applies engine torque to a pump clutch in the torque converter. Then, Step 812 controllably slips the pump clutch. In some aspects, Step 814 limits the torque output.

Figure 9:
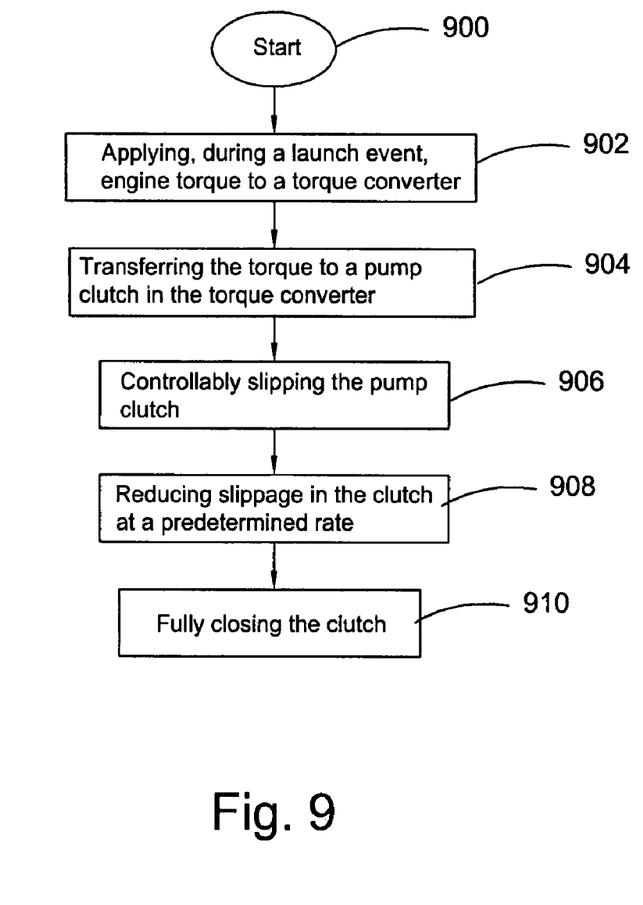

FIG. 9 is a flowchart illustrating a method for increasing turbine speed in a vehicle equipped with a turbocharged engine in accordance with the present invention. The method starts at Step 900. Step 902 applies, during a launch event, engine torque to the torque converter. Step 904 transfers the torque to a pump clutch in the torque converter. Step 906 controllably slips the pump clutch. Step 908 reduces slippage in the clutch at a predetermined rate. Step 910 fully closes the pump clutch.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A method for increasing engine speed and engine torque during a launch event in a vehicle equipped with a turbocharged engine, comprising:
   opening a pump clutch for a torque converter;
   applying, to initiate said launch event, engine torque to a damper for the torque converter, wherein the engine is rotating at a first speed when the engine torque is applied to the damper;
   for a first time period beginning at the initiation of the launch event, maintaining the pump clutch in the torque converter in an open position such that a pump for the torque converter is not receiving torque from the damper;
   during the first time period, increasing the first speed for the engine;
   after the expiration of the first time period, controllably slipping said pump clutch to transfer said torque to the pump;
   reducing slippage in said pump clutch at a predetermined rate; and,
   fully closing said pump clutch.

2. A system for controlling engine speed, engine torque, and torque converter output in a vehicle, comprising:
   a damper connected to an output for an engine in said vehicle and for receiving torque from the engine;
   a pump clutch with an input connected to the damper and with an output connected to an input for a torque converter; and,
   a control element configured to controllably slip said pump clutch at a predetermined rate, wherein:
      said engine is turbocharged and said control element is configured to controllably slip said pump clutch during a launch event for said vehicle;
      at an initiation of the launch event, the engine is for transferring torque to the damper;
      the control element is for opening the pump clutch prior to the initiation of the launch event and keeping the pump clutch open for a first time period beginning at the initiation of the launch event such that a speed of rotation for the engine increases during the first time period and such that a pump for the torque converter does not receive torque from the damper during the first time period;
      said control element is configured to reduce slippage in said pump clutch at a predetermined rate after expiration of the first time period; and,
      said control element is configured to close said clutch after said clutch is controllably slipped.

3. The system of claim 2 further comprising:
   a sensing element configured to determine a parameter associated with operation of said vehicle and to provide a signal regarding said parameter to said control element; and, wherein said control element is configured to controllably slip said clutch responsive to said signal.

4. The system of claim 3 wherein said parameter is regarding traction for said vehicle.

5. The system of claim 3 wherein said control element is configured to limit said torque output.

* * * * *